Patented Nov. 13, 1951

2,574,930

UNITED STATES PATENT OFFICE 2,574,930

BITUMINOUS COMPOSITION

Reginald Gordon Mitchell, Brighton, Stanley Alfred Hunn, Hassocks, and Raymond George Green, New Malden, England, and Willem L. Ghijsen, Amsterdam, Netherlands, assignors to Shell Development Company, San Francisco, Calif., a corporation of Delaware No Drawing. Application March 24, 1947, Serial No. 736,624

9 Claims. (Cl. 106—277)

This invention pertains to the treatment of porous or pervious masses with various bitumen emulsions or mixtures of bitumen with other materials, said bitumen and/or mixtures of bitumen containing a new and novel coagulating or flocculating agent so as to render porous masses, when treated with such compositions, impervious or substantially impervious to water, gases and the like. Porous or pervious masses requiring such treatment include sand soils, earth masses, various types of construction masonry, concrete, cement and the like. The novel compositions of this invention may be used for fixing loose or mobile subsoil and/or filling and tightening cavities, fissures, and other interruptions of masses in and on the ground and in various structures, so as to render them impervious or substantially impervious to water and/or gases.

The treatment of porous or pervious masses so as to render them impervious or substantially impervious to water and/or gases has many practical applications particularly in the building of dams, canals, sluices or dykes in porous soil, where it is desirable to stop percolation of water through sand, or in the construction of bridge pillars, landing piers, tunnels and the like, and in ground formation which is not firm or impervious. Impermeabilizing porous masses is also applicable in the treatment of oil and gas wells, whereby water and gas layers are sealed off and do not interfere with oil flow. Likewise such treatment of porous masses is of great value in oil well drilling through porous formations by aiding drilling muds to form an impervious mud sheath on the walls of the borehole and prevent water from entering the borehole. Roadbeds, tennis courts and other porous masses also can be impermeabilized by treatment with bitumen emulsions containing a coagulant. Not only bitumen emulsions, but bitumen emulsions containing sols, hydrosols, organosols and the like, as well as sols, hydrosols, organosols per se, can be treated with coagulants so as to cause their precipitation or flocculation.

In order to fill the porous cavities in the ground or in structures as mentioned above, various bitumen mixtures can be injected or mixed by suitable means into porous cavities so as to fill their voids and make the treated mass firm and impervious to water and gases. The complex problem involved in preparing bitumen emulsion mixtures under consideration is that they must possess the property of being capable of penetrating the smallest crevices, interstices and pores of the mass treated, to a desired depth before breaking or coagulation of the bitumen emulsion occurs. Also it is usually desirable that coagulation of the bitumen emulsion should occur not only at a predetermined depth or place but at a predetermined time.

To accomplish these results various bitumen emulsions have been and are used containing different emulsifying agents, penetrants, stabilizers, fillers, coagulants and the like. Some well known bitumen emulsions for use in impermeating porous masses comprise mixtures of bitumen and colloidal clays in combination with organic peptizing agents, e. g. hydroxides of water-soluble polyvalent metals, to which are added as coagulating agents, easily hydrolyzable esters, such as methyl and ethyl formate. Other well known coagulants are weak bases, salts of weak bases and strong acids, and salts of weak bases and weak acids which are capable of producing gels from water-soluble silicates which aid bitumen emulsions in sealing off porous formations. Oil-soluble cation surface active compounds such as quaternary ammonium compounds, amine salts of organic acids and the like have been used as coagulants for asphaltic emulsions containing soap and casein in order to impermeabilize porous masses. Also acids and gases such as carbon dioxide, sulfur dioxide, chlorine and ammonium have been proposed and used as coagulating agents in bitumen emulsions for impermeabilizing porous formations against water and gases. The art also discloses the coagulation of bitumen emulsions by use of acids or acidic salts in combination with antimony trioxide, antimony pentoxide and titanium oxide.

The prime purpose of bitumen emulsions of the type discussed above or any bitumen emulsion for use in impermeabilizing porous masses against water and/or gases, is to produce a finely dispersed stable bitumen emulsion having the property of penetrating through porous masses to a desired depth and at or during determined intervals to coagulate and form layers which render the mass impervious to water and/or gases. The desirability of having bitumen emulsions in a stable state while penetrating porous masses is due to the ability of stable compositions to travel greater distances into porous matter and enter smaller crevices than unstable dispersions. Consideration should also be given when preparing bitumen emulsions as to selection of the composition of the dispersion, the particle size of the dispersant, the nature of the dispersing agent, the kind of stabilizers, penetrants, electrolytes and coagulants used. By careful consideration of these factors and their combination, the depth of penetrability of bitumen emulsions into porous masses and their coagulation at a desired distance and time can be controlled with some degree of certainty.

As disclosed above various combinations, processes and chemical treatments of bitumen emulsions have been tried in order to produce a product capable of penetrating porous masses to desired depth and thereafter coagulating or causing coagulation during the penetration process, or to treat porous surfaces or masses with bitumen emulsion containing coagulants so as to make them impermeable or substantially impermeable to water and/or gases.

It is an object of this invention to produce an improved bitumen emulsion composition having the ability of impermeabilizing porous masses against water and/or gases. It is another object of this invention to provide bitumen emulsion compositions having the property of penetrating through porous masses to a desired depth and therein coagulating. Still another object of this invention is to provide bitumen emulsion compositions having the property of penetrating through porous masses to a desired depth and at a determined interval to coagulate and form layers which render the mass impervious to water and/or gases. Furthermore it is an object of this invention to gel, coagulate or flocculate not only bitumen emulsions and their mixtures, but solutions of water glass, zincates, plumbates, aluminates and the like preferably at a pH below 7 and preferably at a pH between about 3 and 6.5.

It has now been discovered that the above and other objects may be attained in accordance with the present invention by treating porous masses so as to impermeabilize them against water and/or gases with a bitumen emulsion containing a new and novel coagulant obtained by treating an aliphatic aldehyde with oxygen yielding reactive materials. Specifically, porous masses may be impermeabilized by the addition of bitumen emulsions containing a coagulant obtained by treating water-soluble and partially water-soluble aliphatic aldehydes containing up to about five carbon atoms in the molecule with substances containing reactive oxygen. Such porous masses may be impermeabilized by addition to bitumen emulsions, before, during or after said bitumen emulsions are injected into the porous masses being treated, of a coagulating agent obtained by reacting water-soluble or partially water-soluble aliphatic aldehydes with substances containing reactive oxygen. Furthermore, the coagulation or flocculation, under controlled conditions, of bitumen emulsions containing materials such as water glass (concentrated sodium silicate solution) and other alkali silicates, solutions of resins in alkali, water-soluble hydroxides of polyvalent metals such as Al, Fe, Sn and the like, zincates, plumbates, aluminates, rosin soap, and the like, can be greatly facilitated by the coagulant of this invention, namely the reaction product of water-soluble or partially water-soluble aliphatic aldehydes with reactive oxygen containing materials. The coagulation of such mixtures is enhanced when in acidic mediums. In addition water glass, zincates, plumbates, aluminates and the like may be coagulated per se by means of a coagulant of this invention, at a pH below 7 and preferably at a pH between 3 and 6.5.

The aldehydes used in producing the coagulant of this invention may contain various substituent groups such as O, OH, $NH_2$, $NO_2$, SCN, $SO_2$, $SO_3H$ and the like. These substituent groups attached to the aldehyde increase the water solubility of the product and aid in enhancing its coagulating properties. The reactive oxygen containing substances may be air, oxygen, organic peroxides, hydrogen peroxide, alkali permanganates, and the like.

In forming the aliphatic aldehyde-oxygenated coagulant of this invention it is preferable to carry out the reaction in the presence of a catalyst such as potassium ferrocyanide. Also in combining the aldehyde and oxygenated reactive substance, it is desirable to use slight excesses of aldehyde so as to insure against gaseous formations at any time during the coagulation process. The amount of coagulant used depends upon the pH of the bitumen emulsion mixture, the kind and amounts of stabilizing and gelation agents present in said emulsion and the velocity at which coagulation is desired. However sufficient coagulating agent of this invention should be added to a bitumen emulsion or other materials so as to adjust the pH of the emulsion below 7 and preferably below 6.5, to insure the coagulation of the bitumen mixture and the like. If the presence of large amounts of electrolytic solutions such as brine, calcium chlorine, magnesium chloride, aluminum sulfate, saline liquors or other coagulating agents are known to be present in the porous mass treated, the amount of coagulant of this invention can be reduced or the mass can be treated, prior to injection with bitumen emulsion, with pure water or alkaline solutions so as to inhibit coagulation from taking place too readily.

Although any water-soluble and partially water-soluble aliphatic aldehyde can be used in this reaction, it is preferable to use formaldehyde and acetaldehyde because of their availability, cost, solubility and reactivity with bitumen emulsions, zincates, plumbates, aluminates and the like. The preferred reactive oxygen substance is hydrogen peroxide and it is preferable to carry out said reaction in the presence of a potassium ferrocyanide catalyst.

The impermeabilization to water and/or gases of porous masses which may or may not be easily excessible, in accordance with this invention, is accomplished by causing stable dispersion of bituminous substances in liquid mediums to penetrate under pressure or by any other suitable means into the porous mass treated or to allow the dispersion to spread through the mass treated and penetrate to a desired depth. The bituminous substances with or without the presence of substances having tendencies to gel, but containing the coagulating agent of this invention causes coagulation of the bitumen emulsion which deposits into the pores of the mass treated and form with it an integrated non-porous mass, impermeable or substantially impermeable to water or gases.

In preparing a bitumen dispersion it is preferable to have the particle size of the dispersed phase smaller than the pores of the mass treated so as to facilitate penetration of the dispersant through the pores of the mass and spreading throughout without hindrance. Also by proper selection of the composition of the dispersion as to concentration of the dispersed phase, the nature of the dispersing agent, stabilizer and gelation agent, it is possible to relatively control coagulation of a dispersion at a predetermined time after it has penetrated a certain distance into the porous mass treated. The coagulating agent of this invention may be added to the porous mass treated prior, during or after a bitumen emulsion dispersant is injected into the mass and the procedure is governed by variable factors such as the velocity of peneration, the place where it is desired for coagulation to take place, the condition of the mass treated, the presence of impurities or hindering agents and the like in the mass under treatment, etc.

Stabilizers which can be used for forming stable bitumen emulsions can be: casein, albumin, hemoglobin, peptones, gelatoses, water-soluble gums and mucilages (arabic, tragacanth, Irish moss) celloidal carbohydrates such as starch, lanolin, lecithin, sulfonated oils, gum resins and soaps which in addition to acting as emulsifiers, because of their capillary activity promote or aid in the penetration of bitumen into the pores of the mass treated. In forming stable bitumen emulsion it is preferable to use a minimum, but sufficient amount of any of the above stabilizers since the less stabilizer used, the lower the pH of the emulsion is and the less coagulant is finally required to convert the emulsion to a pH lower than 7.

Finely divided colloidal inorganic and organic substances such as argillaceous earth, kaolin, fuller's earth, bentonite, hide powders, Cassel earth, diatomaceous earth and the like can be added to bitumen emulsions to aid in initial stability and later in helping to impermeabilize porous masses. The presence in bitumen emulsions of gel forming substances is also desired and may include water glass, alkali aluminate, alkali zincate, plumbate, oxide sols of Fe, Cr, Mo, V, Si and Sn which are obtained by coagulation or flocculation of the hydrous oxides of these metals with the reaction product of this invention.

Broadly stated a preferred method of carrying out this invention into practice can be attained by having a bitumen dispersion containing various added substances as disclosed above conducted to the porous mass to be treated, which may be situated at a substantial depth or not, by means of pipes, the lower end of which is open and reaches the porous layer or the bitumen composition can be distributed through the mass by any other suitable means. If pipes are used, calculated quantities of dispersion is poured into the end opening of the pipes and spreads into the porous mass, filling the voids thereof. The dispersion thereupon coagulates under conditions which are adjustable to the character and rate of stability of the dispersant, gel forming agent used and the coagulating agent used, which, in accordance with this invention can be an aliphatic aldehyde-peroxide reaction product, said reaction product being formed, is desired, in the presence of potassium ferrocyanide catalyst.

When bitumen emulsions of the invention are used for filling coarse grained soils such as gravel layers or for filling cavities and other relatively wide interruptions of mass in the group, coarse particles of non-colloidal nature can be added to the bitumen dispersion, care being taken however that the emulsion is of such stability that no premature coagulation takes place until it has penetrated to a desired place. In treatment of coarse grained masses it might be applicable to use different kinds of bitumen emulsions successively. Thus, when treating coarse masses the first treatment might consist in using a coarse bitumen emulsion so as to fill large voids and thereafter injecting a finely divided bitumen emulsion in order to fill and tighten the remaining voids in the porous mass treated.

To more fully illustrate this invention the following examples are cited to show the method of applying and using the new and novel bitumen emulsion coagulating agent of this invention with various bitumen emulsions in treating porous or pervious masses so as to render them impervious or substantially impervious to water or gases. The illustrative examples are not to be construed as a limitation of this invention and many modifications can be made without departing from the spirit and scope of the invention, and only such limitations should be imposed as are included in the appended claims.

*Example I*

A petroleum distillation bitumen is dispersed in a suitable quantity of 0.35 to 0.5% sodium hydroxide solution heated to 40° C. and to which 15% wood tar has been added in order to form wood tar soap so as to emulsify the composition. The mixture is added to a colloidal mill for extensive mixing to which, if desired, 1 to 2% casein can be added in order to stabilize the dispersed emulsion. The mixture is then removed from the colloidal mill and sufficient water added so that the bitumen content ranges from 40–60% of the entire mixture. Thereupon about 0.2% by weight of sodium aluminate and 0.5% by weight of potassium ferrocyanide is added to the bitumen emulsion, followed by the addition of a solution of hydrogen peroxide and acetaldehyde in the ratio of 0.8% by weight of hydrogen peroxide and 4.0% by weight of acetaldehyde, in order to facilitate and aid in coagulating the bitumen at a required place and time. The weight percentage of the coagulating agents are based on the amount of bitumen present in the mixture.

*Example II*

Approximately 50% bitumen dispersion, prepared in any convenient known manner as for example in a colloidal mill is emulsified with a minor amount of about 1.5% of a mixture of liquid rosin soap and potassium oleate and stabilized with from 1 to 2% casein and thereafter diluted with suitable amounts of water. To the mixture is added about 0.2% to 0.5% potassium aluminate and minor amounts sufficient to cause coagulation at a desired place and time of formaldehyde-hydrogen peroxide reaction product. This mixture can be injected into porous masses to be impermeabilized in any known or suitable manner.

*Example III*

About 40 to 60% bitumen is dispersed in an aqueous solution containing approximately 1.6% of sodium naphthenate and about 0.3 to 0.5% sodium aluminate. To this dispersion is added 1 to 2% casein and about 2 to 3% of formaldehyde-hydrogen peroxide reaction product and the entire bitumen emulsion injected into a porous mass which is to be impermeabilized.

*Example IV*

A suitable bitumen is dispersed by any suitable means in an aqueous medium and emulsified with minor amounts of sodium naphthenate and stabilized with about 2% casein both being calculated on the weight of bitumen used. To the emulsion is added a minor amount of sodium aluminate to facilitate gelation of the mixture. A coagulating agent prepared by reaction of acetaldheyde-hydrogen peroxide in the presence of potassium ferrocyanide then is added to the bitumen emulsion in amounts sufficient to adjust the pH of the emulsion slightly below 7 and preferable at 6.5. The bitumen dispersion is diluted finally with water until its content is about 70% by weight of the entire mixture, and injected into a porous mass to be impermeabilized.

It is preferable, although not necessary, that the emulsions as disclosed above be prepared one or two hours prior to injection into porous masses to be treated in order to avoid the possibility of gaseous formation. The emulsion thus prepared is injected into porous masses to be impermeabilized by means of pipes drilled into a porous mass and spaced at desired distances. Coagulation of the bitumen by means of the coagulants of this invention proceeds at a controlled rate heretofore unknown in the art.

In preparing the coagulating agent of this invention for bitumen emulsions it is necessary to take precautions against gas formation while the coagulant is in admixture with the emulsion. To avoid this, the amount of aliphatic aldehyde, for example, acetaldehyde used in a reaction should be in such excess that less than about 10 mol per cent of the total peroxide used occurs as free hydrogen peroxide in the solution. Also it is preferable to add potassium ferrocyanide as a catalyst in order to promote the reaction so as to cause the emulsion to reach more quickly a pH value below 7, thus facilitating coagulation of the bitumen and prevent gaseous formations. It is also desirable to use a very minimum of stabilizing agent such as casein in preparing bitumen emulsions for use with coagulating agents of this invention.

The present invention having thus been fully described is not to be limited by any specific examples which have been presented herein solely for the purposes of illustration, but only by the following claims.

We claim as our invention:

1. An alkaline asphalt emulsion of the asphalt-in-water type containing 40–60% by weight of asphalt, 0.2–0.5% alkali metal aluminate, 1–2% casein, emulsifying amounts of a water-soluble soap-type emulsifier, hydrogen peroxide and acetaldehyde, the amounts of peroxide and aldehyde being sufficient, when reacted together, to lower the pH of the emulsion to between 3 and 7.

2. An alkaline asphalt emulsion of the asphalt-in-water type comprising major proportions of asphalt and water, an effective amount of a water-soluble emulsifying agent, hydrogen peroxide and acetaldehyde, the amounts of peroxide and aldehyde being sufficient, when reacted together, to lower the pH of the emulsion to between 3 and 7.

3. An alkaline asphalt emulsion of the asphalt-in-water type comprising major proportions of asphalt and water, an effective amount of water-soluble emulsifying agent, hydrogen peroxide and an aldehyde having less than 6 carbon atoms, the amounts of peroxide and aldehyde being sufficient, when reacted together, to lower the pH of the emulsion to between 3 and 7.

4. An alkaline asphalt emulsion of the asphalt-in-water type comprising major amounts of asphalt and water, an effective amount of a water-soluble emulsifying agent, a water-soluble aldehyde and an oxidizing agent therefor, the amounts of aldehyde and oxidizing agent being sufficient, when reacted together, to reduce the pH of the emulsion to between 3 and 7.

5. An alkaline asphalt emulsion of the asphalt-in-water type containing 40–60% by weight of asphalt, 0.2–0.5% sodium aluminate, 1–2% casein, emulsifying amounts of a water-soluble soap type emulsifier, hydrogen peroxide and acetaldehyde, the amounts of peroxide and aldehyde being sufficient, when reacted together, to lower the pH of the emulsion to between 3 and 7.

6. An alkaline asphalt emulsion of the asphalt-in-water type comprising major proportions of asphalt and water, an effective amount of potassium oleate, a water-soluble aldehyde and an oxidizing agent therefor, the amounts of aldehyde and oxidizing agent being sufficient, when reacted together, to reduce the pH of the emulsion to between 3 and 7.

7. An alkaline asphalt emulsion of the asphalt-in-water type comprising major proportions of asphalt and water, an effective amount of sodium naphthenate, a water-soluble aldehyde and an oxidizing agent therefor, the amounts of aldehyde and oxidizing agent being sufficient, when reacted together, to reduce the pH of the emulsion to between 3 and 7.

8. An alkaline asphalt emulsion of the asphalt-in-water type comprising major amounts of asphalt and water, 0.2–0.5% of alkali metal aluminate, an effective amount of a water-soluble emulsifying agent, a water-soluble aldehyde and an oxidizing agent therefor, the amounts of aldehyde and oxidizing agent being sufficient, when reacted together, to reduce the pH of the emulsion to between 3 and 7.

9. An alkaline asphalt emulsion of the asphalt-in-water type comprising major amounts of asphalt and water, an effective amount of a water-soluble soap, a water-soluble aldehyde and an oxidizing agent therefor, the amounts of aldehyde and oxidizing agent being sufficient, when reacted together, to reduce the pH of the emulsion to between 3 and 7.

REGINALD GORDON MITCHELL.
STANLEY ALFRED HUNN.
RAYMOND GEORGE GREEN.
WILLEM L. GHIJSEN.

REFERENCES CITED

The following references are of record in the file of this patent:

UNITED STATES PATENTS

| Number | Name | Date |
|---|---|---|
| 1,050,696 | Rost | Jan. 14, 1913 |
| 1,597,700 | Walker | Aug. 31, 1926 |
| 2,176,266 | Malmberg | Oct. 17, 1939 |
| 2,201,459 | Van Hulst | May 21, 1940 |
| 2,206,062 | Suthard | July 2, 1940 |
| 2,236,147 | Lerch et al. | Mar. 25, 1941 |
| 2,330,100 | Williams | Sept. 21, 1943 |
| 2,417,329 | Snyder | Mar. 11, 1947 |

FOREIGN PATENTS

| Number | Country | Date |
|---|---|---|
| 87,999 | Austria | Apr. 10, 1922 |